Aug. 2, 1966  M. D. TUPPER  3,264,045
LUBRICATION SYSTEM FOR DYNAMOELECTRIC MACHINES
Filed Jan. 2, 1964  3 Sheets-Sheet 1
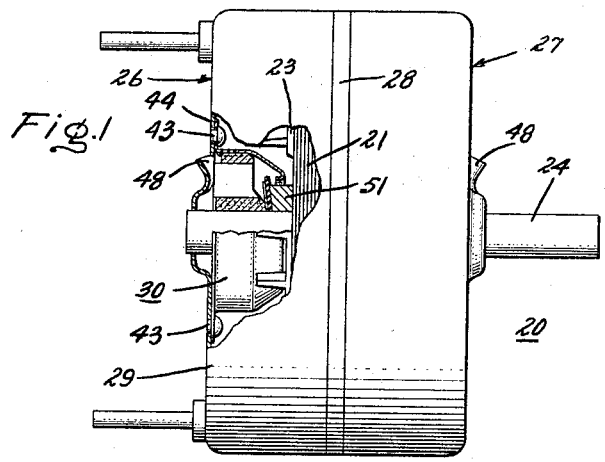
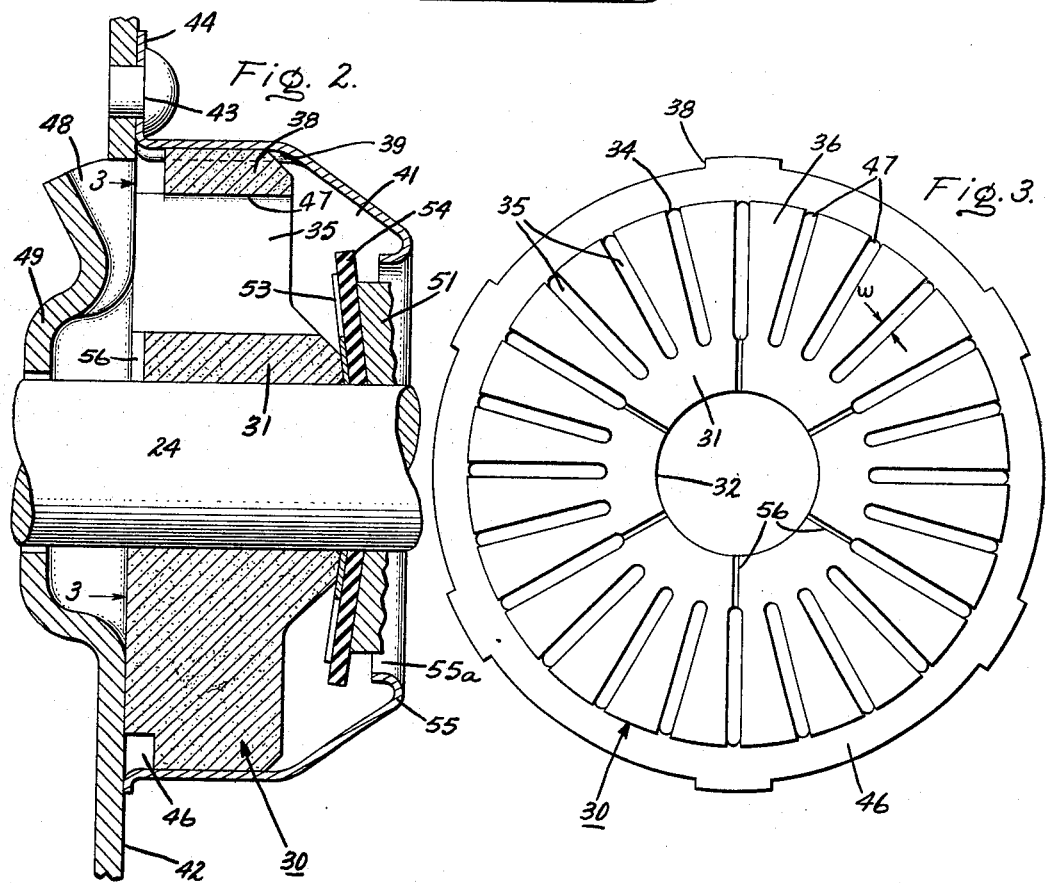
Inventor:
Myron D. Tupper,
by John M. Stoudt
His Attorney.

Aug. 2, 1966  M. D. TUPPER  3,264,045
LUBRICATION SYSTEM FOR DYNAMOELECTRIC MACHINES
Filed Jan. 2, 1964  3 Sheets-Sheet 2
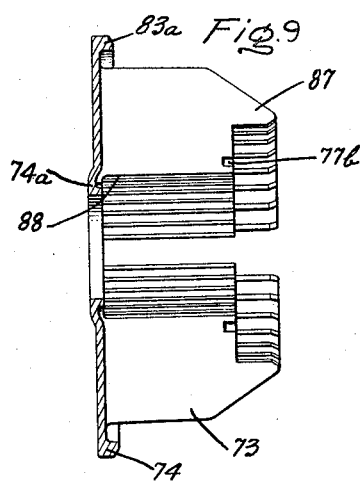
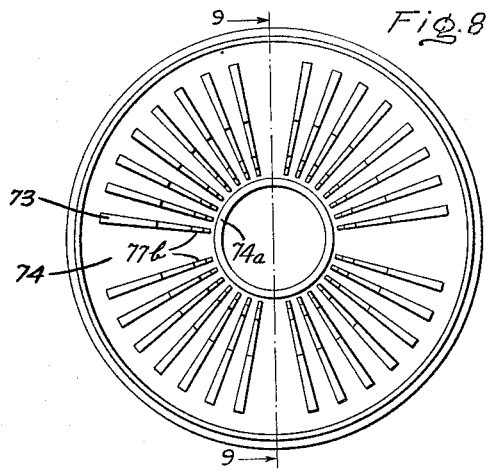
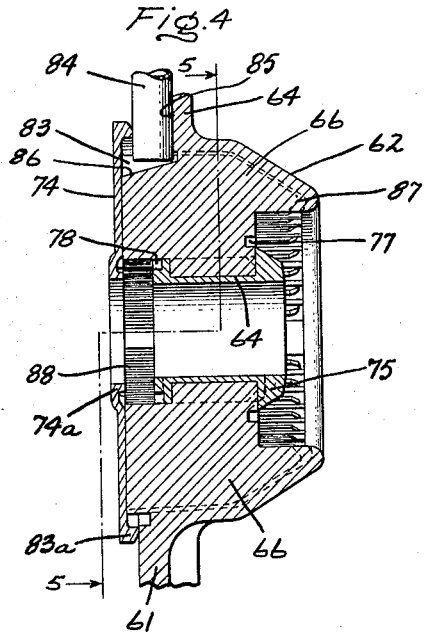
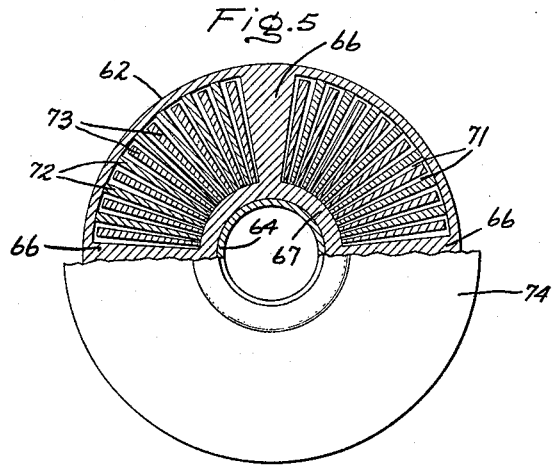
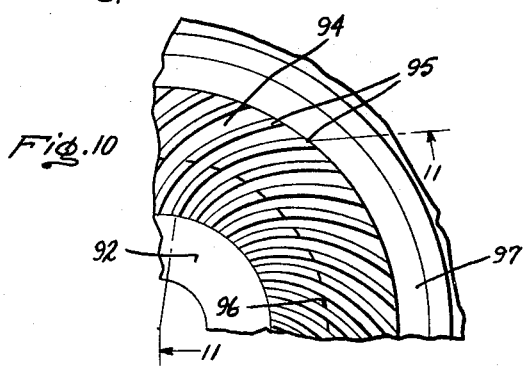
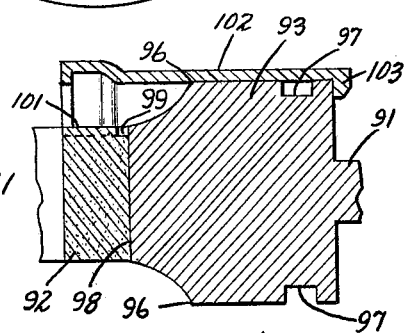
Inventor:
Myron D. Tupper,
by John M. Stoudt
Attorney.

Aug. 2, 1966  M. D. TUPPER  3,264,045
LUBRICATION SYSTEM FOR DYNAMOELECTRIC MACHINES
Filed Jan. 2, 1964  3 Sheets-Sheet 3
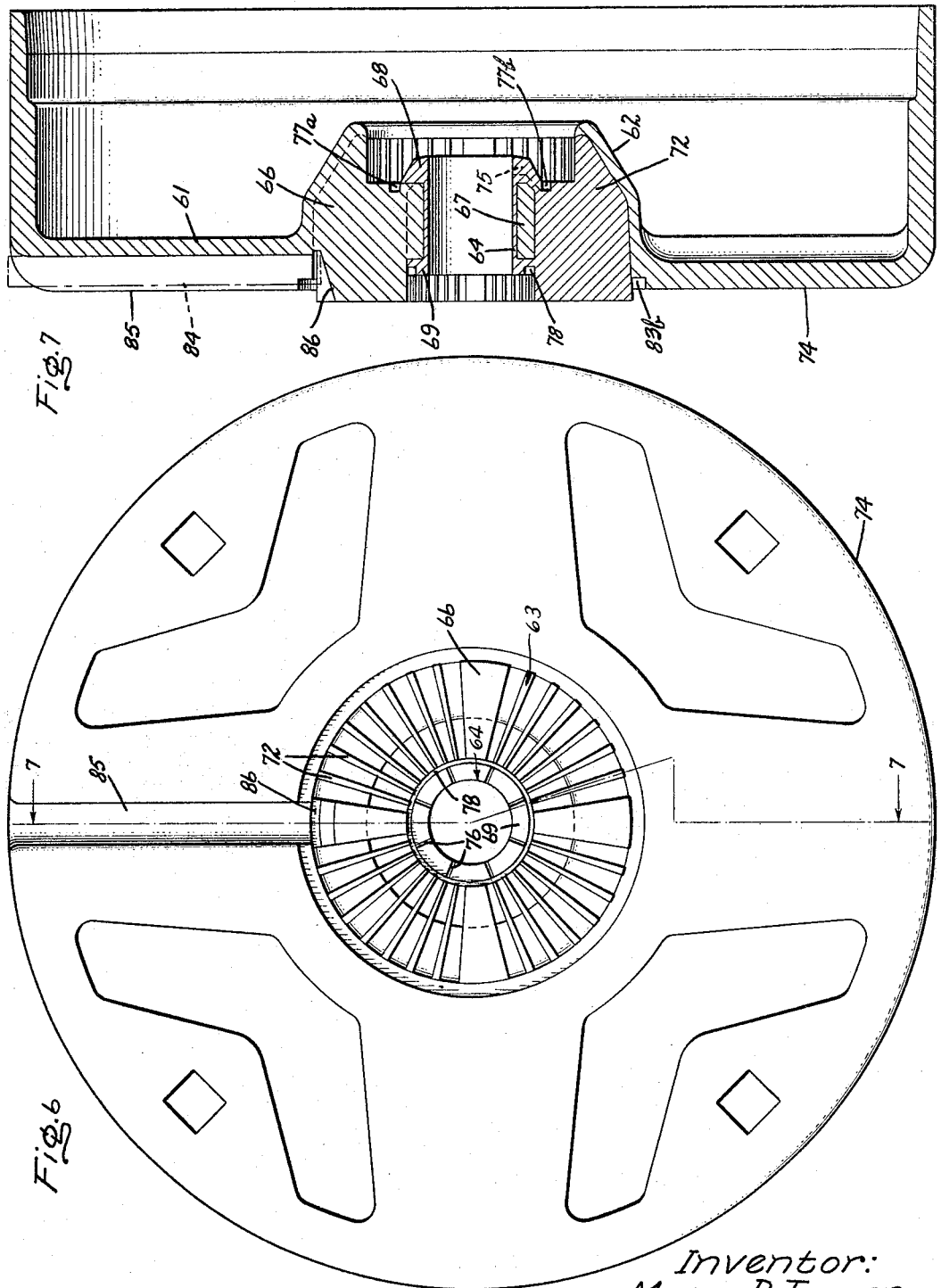
Inventor:
Myron D. Tupper,
by John M. Stoudt
His Attorney.

United States Patent Office 3,264,045
Patented August 2, 1966

3,264,045
LUBRICATION SYSTEM FOR DYNAMO-
ELECTRIC MACHINES
Myron D. Tupper, Fort Wayne, Ind., assignor to General
Electric Company, a corporation of New York
Filed Jan. 2, 1964, Ser. No. 335,282
12 Claims. (Cl. 308—240)

This invention relates in general to bearing and shaft lubrication constructions, and more particularly to an improved dynamoelectric machine bearing lubricant storage and transfer system.

In small equipment having shafts rotatably journaled by sleeve-type bearings, such as small and fractional horsepower electric motors, the provision of adequate lubrication to the journal surfaces is extremely important, especially for those applications in which the motors are mounted in relatively inaccessible locations and are required to operate for long periods of time without supervision. Therefore, in many motor constructions it is customary to furnish each end frame with a lubricant reservoir which surrounds the bearing carried by the frame. The reservoir usually includes absorbent fibrous material, such as a felt pad, for storing the lubricant until it is gradually fed or transferred by capillary action from the reservoir to the bearing journal surfaces by a wick extending entirely through the bearing or other suitable means during operation of the equipment.

In the past, the above described general approach has not been entirely satisfactory for several reasons. For instance, it was difficult to predict with any degree of accuracy the total lubricant reservoir storage capacity and rate at which the lubricant was delivered from the reservoir, these properties varying greatly from one reservoir to another. Moreover, it was impossible to transfer substantially all of the lubricant from the individual reservoirs to the journal since some, an unmeasured amount, of the lubricant was always required in the reservoir for establishment of a capillary path to the bearing. These inconsistent lubrication characteristics between individual reservoirs was probably due, at least in part, to variable fiber lengths and cross section which formed uncontrolled capillary paths in the absorbent material of differing densities.

Another inherent deficiency normally associated with past lubrication storage arrangements is the expense involved in their manufacture and assembly, both in regard to labor costs and number of components required. Further, there is a problem in the handling of the wicks and reservoir absorbent material since these pieces were normally pre-lubricated, that is, saturated with lubricant before assembly in order to insure a capillary path to the bearing journals.

It is therefore a general object of the invention to provide an improved, yet low cost, lubricant storage and transfer system, especially suitable for use in dynamoelectric machines, and it is a more specific object to provide such system which overcomes the difficulties mentioned above.

It is another specific object to provide an improved dynamoelectric machine lubricant storage arrangement in which the storage capacity and ability to deliver lubricant are readily controlled, and substantially all of the stored lubricant may be used.

In carrying out the objects of the present invention in one form thereof, I provide improved lubrication storage and transfer system for a dynamoelectric machine. In particular, the system includes a bearing section having a bore for rotatably journaling the dynamoelectric machine shaft and a lubricant retaining reservoir section entirely surrounding the bearing section. The reservoir is defined by a number of angularly spaced apart generally elongated and axially extending capillary slots which are sufficiently small in width to provide storage of lubricant by capillary attraction between the lubricant and the walls defining the slots. These slots taper from a maximum dimensional width at their outermost regions to a minimum near the bearing section so that they provide a positive capillary path toward the bearing from the outermost slot storage regions. The slot walls overhang at least one end of the bearing such that the slots are substantially unobstructed in the vicinity of the associated bearing end. This construction augments the storage capacity of the reservoir and serves to recapture any excess lubricant which may be slung outwardly from the encompassed end of the bearing. For adding lubricant to the capillary storage slots, a channel encircles at least one outermost edge of the slots and is accessible from a location externally of the machine. The channel has a radius dimensionally greater than that which establishes capillary attraction for the lubrication and, as such, also acts as a capillary barrier to prevent the escape of lubricant from the individual slots by capillary attraction across the area of the channel.

The bearing section may also be formed at its upper, outer edge with an annular capillary groove which is in communication between the lower regions of the individual capillary storage slots and a number of capillary grooves provided on the end face of the bearing which extend to the bearing bore. These grooves together serve as a capillary path for transferring the lubricant in either direction between the lower regions of the slots and the bore, depending upon the lubricant requirements dictated by the shaft. This system provides a large storage capacity with an ability to deliver lubricant under readily controlled conditions. Further, it insures that substantially all of the stored lubricant is available for use.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:
FIG. 1 is a side elevational view, partially broken away and partially in cross-section, of a small dynamoelectric machine incorporating one form of the present invention;
FIG. 2 is an enlarged fragmentary view of the left hand bearing lubrication arrangement seen in FIG. 1, the view being in cross-section to illustrate details;
FIG. 3 is a view taken along line 3—3 in FIG. 2;
FIG. 4 is a fragmentary view in cross-section of a small dynamoelectric machine cast end frame unit incorporating a second form of the present invention;
FIG. 5 is a view taken along line 5—5 in FIG. 4 to show details of the lubricant reservoir;
FIG. 6 is an end elevational view of the entire cast end frame component which forms a portion of the assembly shown in FIG. 4;
FIG. 7 is a view taken along line 7—7 in FIG. 6;
FIG. 8 is an end view of another component seen in FIG. 4 assembled together with the end frame component of FIGS. 6 and 7;
FIG. 9 is a view taken along line 9—9 in FIG. 8;
FIG. 10 is an enlarged fragmentary end view of yet another form of the present invention incorporated in a cast type bearing supporting end frame; and
FIG. 11 is a view taken along line 11—11 in FIG. 10.

Referring now to the drawings in more detail and in particular to FIGS. 1–3 inclusive, the first embodiment of the invention is illustrated as being incorporated in a small electric motor generally identified by numeral 20. The motor of the exemplification has a stator of conventional design (not illustrated) and a rotor 21 having a laminated core provided with a standard squirrel cage type cast winding 23. The rotor is secured to rotate with a shaft 24 which in turn is supported on either side of rotor 21 by a pair of identical end frames 26 and 27 attached to the outer periphery of the stator by any suitable means; e.g., weld 28. For simplicity of illustration and brevity of description only one of these end frames, 26, is shown in detail.

As illustrated, end frame 26 has a generally cup shaped member 29 stamped from suitable sheet material, such as steel, which mounts an improved bearing and lubricant storage and transfer arrangement. With reference to FIGS. 2 and 3, it will be seen that lubricant impregnated permeable unit 30 is defined by an inward bearing section 31 having a bore 32 for journalling the shaft, and a lubricant reservoir section 34. This latter section is disposed outwardly from and surrounds the bearing section for a major portion of its axial length. Section 34 stores a large quantity of lubricant in a number of angularly spaced apart capillary slots 35 which along with the permeable oil impregnated regions 36 together define the total oil storage capacity of the reservoir. However, the slots which in this embodiment extend entirely through the axial length of reservoir section 34, are capable of holding by far the major quantity of the stored lubricant, depending upon the total number of capillary slots employed. Each slot is illustrated as being radially elongated, terminating below the outer axial surface of section 34, and has a dimensional width "$w$" sufficiently small to insure that it acts as a capillary. For most suitable grades of lubricants, "$w$" below .06 inch is satisfactory to create the requisite capillary characteristics for the slots. In particular, the exact dimension of "$w$" for a given application will be controlled by the major dimension of the reservoir, that is to say, by the axial length of the slots or the diameter across the reservoir to the upper ends of the slots, whichever is dimensionally greater. The maximum permissible dimension for "$w$" will vary inversely to the major dimension of the reservoir. Generally speaking, the greater the major dimension, the less the permissible dimension of "$w$." Thus, for an extremely small major dimension, "$w$" would approach but not exceed .06 inch.

During operation of motor 10, the lubricant is fed at a controlled rate from the walls of these slots by capillary action, through capillary passages defining a radial path through the permeable body of bearing section 31 to bore 32 for lubrication purposes. Consequently, the integrally formed bearing and reservoir unit of the first embodiment may be constructed from any suitable material which is capable of furnishing the desired capillary paths as well as the low friction journal characteristics for bearing bore 32. A total rate in the neighborhood of one tenth of a cubic centimeter per thousand hours of operation has been found to be adequate for many small motor applications. One example is a sintered mixture of aluminum particles. Other satisfactory materials readily suggest themselves to those skilled in the art, such as brass and bronze mixtures having graphite, certain plastics and metal-plastic combinations which are readily manufactured by molding or sintering procedures well understood in the art.

In order to mount the bearing-reservoir unit 30 just described to its support, end frame member 29 in the exemplification, the outer surface of reservoir includes circumferentially spaced apart axial projections 38 which are frictionally accommodated in complementary axial grooves 39 stamped into a cup shaped housing element 41. This element is in turn secured to the inner wall 42 of end frame member 29 by a plurality of rivets 43 projecting through radial flange 44 of element 41 such that the outboard end of the unit abuts against the inner wall 42.

The bearing-reservoir unit may be mounted to end frame member 29 prior to the addition of lubricant to capillary slots 35 but preferably subsequent to the impregnation of sections 31 and 34 with lubricant to establish an initial capillary path from slots 35 to bore 32. FIG. 2 shows the manner in which lubricant may be supplied to the unit after it has been installed into end frame assembly 26. To this end, the face of unit 30 has a circumferential channel 46 provided in its outer edge which interconnects the upper or outermost ends 47 of the individual capillary slots 35. An entrance to this channel 46 is cut into wall 42 of end frame member 29, above capillary ends 47, and is bent into a U-shaped lubricant supply funnel 48. Thus, lubricant may readily be introduced to the capillary slots first through the funnel and then around channel 46. Lubricant can be resupplied to the reservoir in the same way, if the need should ever arise. It should be noted at this time that by making both the radial depth and axial width of channel 46 in excess of .06 inch, the channel will also act as a capillary barrier to seal the slots at this location and prevent lubricant from escaping down inner wall 42, beyond the confines of unit 30.

Intermediate channel 46 and the opening in end frame member 29 through which the shaft projects, the end frame includes a flanged section 49 serving as a dust seal around the outboard shaft end of unit 30. If desired a standard small washer or the like (not shown) may be attached to shaft 24 within the confines of section 49 to act as an oil slinger for returning excess lubricant from that end of the bearing to the capillary slots 35. However, due to capillary return grooves 56 to be described hereinafter, a slinger is not necessary for most applications at this end of the bearing.

From an inspection of FIG. 2, it will be seen that the inboard end of bearing section 31 functions as a stationary, thrust receiving, surface for receiving the axial thrust of the rotor. In particular, a hub 51 is cast about the end of the rotor 21 and extends to a point within the confines of cup-shaped element 41. Between the respective axial extremity of hub 51 and the inboard end of section 31, which preferably slopes inwardly toward the axis of rotation, are positioned a thrust transmitting spring 53 and an oil slinger 54. Spring 53 is of the type disclosed in my Patent 3,038,765 issued June 12, 1962. With reference to slinger 54, it is a resilient washer, made of rubber or the like, and with inwardly projecting flange 55 of element 41, forms an oil seal to prevent lubricant from being transferred beyond element 41. Preferably, the diameter of slinger 54 is greater than the shaft receiving opening 55a defined by flange 55 of element 41. Since the slinger is readily deformable, it may be assembled in the illustrated operative position merely by temporarily deforming it and sliding it through opening 55a. Thus, as oil escapes from the inboard end of bearing section 31, slinger 54 directs the oil generally toward the outermost part of unit 30 for return to slot 35 for reuse.

Turning now to the outboard end of section 31, it includes a number of capillary grooves 56 which extend radially between bore 32 and the bottom or innermost ends of some of the capillary slots 35 for returning excess lubricant, which may accumulate at that end of the bearing, to the capillary slots. Should this end of the bearing become starved of lubricant, for any reason such as the effects of a heavily loaded shaft, these grooves would then function to transfer lubricant from slots 35 to the starved journal. Preferably the width of grooves 56 should be in the order of .020 inch for best results in the desired lubricant transfer path. Although a total of six such grooves and twenty-four capillary slots 35 have been illustrated, it should be recognized that the total number and exact configuration of each type will be dependent upon the circumstances under which unit 30 is employed.

Consequently, it will be appreciated from the above description that the first embodiment of my invention permits, among other things, the employment of a low cost bearing and lubricant reservoir unit in which the storage capacity and ability to transfer lubricant are readily controlled.

Turning now to FIGS. 4–9 inclusive, a second form of my invention is illustrated in connection with a cast type end frame assembly 60 which may be disposed at either end of an electric motor to support the respective ends or a rotor shaft (not shown). As illustrated in this embodiment, the end frame has an outer wall 61 and axially extending housing 62, which together support and surround a lubricant reservoir section 63 and bearing section 64 integrally cast in one piece, for example, from zinc or other suitable material. Four spiders or posts 66, provided integral with housing 62, terminate in a central hub 67. These spiders are cast around the central part of bearing section 64 which is preferably formed in a subsequent casting operation from suitable bearing material, such as the well-known Babbitt material. As best seen in FIGS. 6 and 7, bearing section 64 has enlarged inboard and outboard end sections 68 and 69 respectively which, among other things to be discussed hereinafter, prevent movement of bearing section 64 in an axial direction.

As best seen in FIG. 5, the four spaces radially between bearing section 64 and housing 62 and angularly located intermediate adjacent posts 66, each includes a large number of radially extending capillary slots 71 which together form the lubricant reservoir which substantially surrounds bearing section 64 in the second embodiment. More specifically, these slots are formed between a number of interposed fins or blades 72 and 73 interjected in the space between posts 66. As shown blades 72 are made integral with bearing enlargements 68 and 69 and formed when those enlargements are made, that is, during the casting of the end frame parts shown in FIGS. 6 and 7. These blades are alternately arranged or interfitted with blades 73, which in turn are fabricated or cast as the separate component best seen in FIGS. 8 and 9.

A separate cover plate 74 integrally joins one end of blades 73 together with the desired angular spacing between blades. That is, the blades 73 must leave sufficient room for posts 66 and blades 72 and cooperate to provide capillary slots 71. Plate 74 and its blades 73 may readily be assembled to the end frame revealed in FIGS. 6 and 7 by inserting the free ends of blades 72 into the proper space within housing 62 and sliding the blades toward the inboard side of the end frame until the blades abut against the inner wall of housing 62 as best seen in FIG. 4. In its assembled relation, cover 74 therefore acts to enclose the reservoir at the outboard side of the end frame. To this end, the cover may include a flanged opening 74a which is adapted to have a close fit with the shaft for sealing purposes.

In order to transfer lubricant from capillary slots 71 to the bore of section 64, enlarged ends 68 and 69 of section 64 are furnished with angularly spaced feeding capillary grooves 75 and 76 respectively. Taking the inboard side of the end frame, grooves 75 extend radially between the bearing bore and an annular capillary groove 77 which in turn interconnects the innermost end of the individual capillary slots to this feeding groove. With reference to FIGS. 4, 7, 8 and 9, groove 77 is defined by angularly aligned notches 77a, 77b and 77c formed respectively in the bottom edges of blades 72 and 73 (radially above enlarged section 68 of the bearing) and in the inboard edge of posts 66. At the outboard end of the end frame and bearing, an annular groove 78 provided at the outer upper edge of enlarged section 69, connects the outboard innermost end of slots 71 to radial feeding grooves 76 which communicate with the bore at that end of the bearing section 64.

With the foregoing construction, lubricant may be fed by capillary action under controlled conditions from the bottom of each of the capillary storage slots 71, regardless of the position in which the end frame is mounted, to annular grooves 77, 78, which distribute the lubricant by capillary attraction to feeding grooves 75 and 76 respectively and hence to the bore as dictated by lubricant requirements of the shaft. The capillary transfer system just described has an additional benefit. If a surplus of lubricant ever starts to accumulate at either end of bearing section 64, the capillary system is capable of returning the excess lubricant in a reverse flow to the capillary slots 71 for reuse under the conditions of most motor applicants.

To insure a positive flow of lubricant from the reservoir to the bore under conditions dictating lubricant transfer in that direction, I prefer to gradually diminish the size of the capillary path through which the lubricant travels, from the outermost ends of slots 71 to the bore of bearing section 64. Thus, slots 71 preferably taper from a maximum width adjacent their upper regions to a minimum width adjacent annular grooves 77, 78, which in turn have a radial width somewhat less than the width of the bottom of capillary slots 71. Feeding grooves 75 and 76 should have the minimum width of the capillary system. By way of example, slots 71 may include a width at the upper regions in the neighborhood of .025 inch, with radial grooves 75, 76 each having a minimum width in the system of approximately .015 inch. These are nominal dimensions.

Like the first embodiment, the bearing-reservoir unit of FIGS. 4–9 inclusive is formed with an annular, substantially enclosed channel, shown by numeral 83, which encircles the upper outboard edge of the reservoir and communicates with the outermost ends of each capillary slot 71. This channel functions as the means for admitting lubricant to slots 71 as well as for preventing the escape of lubricant from the slots in the manner described in connection with channel 46 of FIGS. 1–3, i.e., a capillary barrier. Rim 83a of plate 74 (FIG. 9), along with circular notch 83b cut into the outer surface of the frame (FIG. 7), when mounted in back to back relation as seen in FIG. 4, form the enclosed channel 83 in the second embodiment. A tube 84, held within a semicircular recess 85, communicates from a point above the end frame to a location within the enclosed channel 83 for introducing lubricant to the channel and hence to reservoir capillary slots 71, regardless of the position in which the end frame is mounted. As seen in FIGS. 4 and 6, the bottom edge 86 of channel 83 is inclined downwardly, away from tube 84 toward the plate 74, so that a free and unobstructed flow of lubricant is allowed from the lower end of the tube into channel 83 for subsequent distribution into the upper regions of the individual slots 71.

The inboard end of the second embodiment is adapted to use spring 53 and slinger 54 of the thrust system already described with regard to FIGS. 1–3. Thus, spring 53 and slinger 54 transmit axial thrust to enlargement 68 from the bearing. Under these conditions, capillary grooves 75 must have a sufficient depth so that capillary transfer through them will be unaffected by the rotation of spring 53 relative to the thrust receiving surface of 68. Blades 72, 73, and housing 62 are each formed with axial extensions 87, which project axially beyond the inboard end of bearing section 64 and are adapted to encircle spring 53 and slinger 54 in spaced relation. These blade extensions establish a large number of open angularly spaced apart capillary return paths radially outward from the position where the slinger could be utilized, capturing excess lubricant directed outwardly by the slinger and returning it by controlled capillary attraction into capillary slots 71 for reuse. Further, for those applications where there is little, if any, excess lubricant escaping from the inboard end of the bearing, the entire space between extensions 87 can be utilized for the storage of lubricant to augment the capacity of slots 71 disposed directly over bearing section 64. At the other or outboard end of bearing section 64, blades 72 and 73 may also extend beyond that end of the bearing, as indicated at 88, for the same reasons given for the inclusion of extensions 87.

Consequently, it will be seen that the second embodiment has the same basic advantageous features of the embodiment of FIGS. 1, 2 and 3. However, it has additional benefits. For any given reservoir size, the reservoir of the second embodiment is capable of storing a greater quantity of lubricant and provides control or regulation over the rate of lubricant transfer both toward and away from the reservoir as dictated by the lubricant requirements at the bore, the positive and highly effective capillary path for returning excess lubricant from each end of the bearing to the reservoir being extremely effective for most applications. Moreover, all of the stored lubricant can ultimately be fed from the reservoir to the shaft, if needed.

FIGS. 10 and 11 reveal a third embodiment of the present invention in which numeral 91 denotes a cast end frame wall similar in construction to wall 61 of the second embodiment. Wall 91 terminates in a lubricant reservoir 93 formed by a number of outwardly curving capillary slots 94 which are defined between adjacent curved blades 95 having involute walls cast integral with wall 91. The curved slot configuration of this embodiment provides the greatest possible lubricant capillary storage capacity for a given size reservoir of the illustrated reservoirs, and it will be recognized that capillary storage slots 35 and 71 of the first two embodiments may respectively include this shape, if so desired. Enhanced storage characteristics may, of course, be obtained for the reservoirs by providing the capillary slots with shapes other than those illustrated, such as a serpentine, outwardly curving slot. Other contours will readily come to mind from this description.

The inner edges 98 of the blade walls in the third embodiment form a bearing accommodation recess and mount a permeable, sleeve-type, bearing 92 by frictional engagement with the outer peripheral surface of the bearing. Bearing section 92 is fabricated separately from the cast end frame, and as illustrated, is sintered, being similar in composition to bearing section 31 of FIGS. 1–3. Preferably blades 95 have extensions 96 which overhang each end of the bearing for the same reasons as revealed for extensions 87 and 88 in the embodiment of FIGS. 4–9 inclusive.

It should also be noted that in FIGS. 10 and 11, a lubricant adding channel 97 which also functions as a capillary barrier, is furnished at each upper edge of the curved capillary slots, which taper from a maximum near channel 97 to a minimum dimension next to the bearing periphery to provide a positive lubricant flow pattern in the direction of the bearings.

Thus, lubricant will be fed at a controlled rate, as dictated by the lubricant requirements of the shaft, from the capillary slots 94, radially through the capillary path of the bearing 92, then to the bearing bore. If desired, an annular capillary groove 99, similar to groove 78 shown in FIGS. 4 and 6, may be provided at the outer edge of bearing section 92 of at least the outboard end to join the capillary slots 94 together. A number of angularly spaced apart capillary grooves 101 connect annular groove 99 to the bore for transferring accumulated lubricant at the end of the bearing back to the reservoir or in a reverse direction, as lubrication requirements at the shaft dictate.

A removable end cap 102, such as that partially seen in FIG. 11, may be removably mounted over the outboard end of reservoir 93 by a snap-on fit revealed at numeral 103. Consequently, cap 102 encloses the outboard end of the reservoir and channel 97 and seals them from dust and other foreign matter once lubricant has been supplied to the capillary slots 94 by way of the channel. A similar cap may, of course, be employed at the inboard end of the unit. The removable cap or cover plate disposed at the outboard end of the end frame is beneficial in another respect since it can be easily removed periodically to allow a visual inspection of the reservoir, when motor supporting conditions permit, for determining the need of refilling the reservoir with lubricant.

The third embodiment therefore includes the same features and advantages of the second embodiment, but does so at a lower cost, and also furnishes a lubricant storage and transfer system in which the storage capacity and ability to deliver lubricant are readily controlled, with substantially all of the stored lubricant being available for use.

While in accordance with the patent statutes, I have described what at present are considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A bearing and reservoir unit for use in a dynamoelectric machine comprising a bearing section having a bore for journalling a shaft, a lubricant reservoir section generally surrounding said bearing section, said lubricant reservoir section including a plurality of angularly spaced apart and axially elongated capillary slots having their inner regions disposed adjacent said bearing section, said slots extending outwardly from said bearing section with the side walls forming each slot projecting in an axial direction and being sufficiently close together to hold lubricant in the slots by capillary attraction between the walls thereof, feeding means communicating between the inner regions of each slot and said bore for transferring lubricant therebetween, at least one circumferentially extending and non-lubricant retaining channel interconnecting the outer regions of the individual slots, said channel being dimensionally greater than that which sustains capillary transfer of lubricant across the channel to form a capillary barrier for preventing the radial transfer of lubricant outwardly from said slots at that location.

2. A bearing and reservoir unit for use in a dynamoelectric machine comprising a bearing section having a bore for journalling a shaft, a lubricant reservoir section generally surrounding said bearing section, said lubricant reservoir section including a plurality of angularly spaced apart and axially elongated capillary slots having their inner regions disposed adjacent said bearing section, said slots extending outwardly from said bearing section with the side walls forming each slot being sufficiently close together to hold lubricant in the slots by capillary attraction between the walls thereof, at least one end of the bearing section having an annular capillary groove connecting the inner regions of the slots together and a plurality of angularly spaced capillary grooves extending between said annular groove and said bore to establish a capillary path for controlled transfer of lubricant in either direction and means for introducing lubricant to the outer regions of said slots.

3. A bearing and reservoir unit for use in a dynamoelectric machine comprising a bearing section having a bore for journalling a shaft, a lubricant reservoir section including a plurality of angularly spaced apart and axially elongated capillary slots extending outwardly from said bearing section with the side walls forming each slot projecting in an axial direction and being sufficiently close together to hold lubricant in the slots by capillary attraction between the walls thereof, feeding means communicating between the inner regions of the individual slots and said bore for transferring lubricant therebetween, and means for introducing lubricant to said slots.

4. A bearing and reservoir unit for use in a dynamoelectric machine comprising a bearing section having a bore for journalling a shaft, a lubricant reservoir section including a plurality of angularly spaced apart capillary slots extending outwardly from said bearing section with the side walls forming each slot being sufficiently close together to hold lubricant in the slots by capillary attraction between associated slot walls thereof, said capillary slots extending axially beyond at least one end of the bearing section and being exposed to that end for recapturing lubricant which may escape from the bore during operation, feeding means communicating between the inner regions of the individual slots and said bore for transferring lubricant therebetween, and means for introducing lubricant to said slots.

5. A bearing and reservoir unit for use in a dynamoelectric machine comprising a bearing section having a bore for journalling a shaft; a lubricant reservoir section generally surrounding said bearing section; said lubricant reservoir section including a plurality of spaced apart capillary slots having their inner regions disposed adjacent said bearing section; said slots extending outwardly from said bearing section with the side walls forming each slot being sufficiently close together to hold lubricant in the slots by capillary attraction between the walls thereof; said slots tapering from a maximum width at their outer regions to a minimum width at their inner regions; at least one end of the bearing section having an annular capillary groove connecting the inner regions of the slots together; said annular capillary groove having a width dimensionally greater than that of the minimum width of said slots; and a plurality of angularly spaced, radially separated, capillary grooves extending between said annular groove and said bore to establish a capillary path for controlled transfer of lubricant.

6. A bearing and reservoir unit for use in a dynamoelectric machine comprising a bearing section having a bore for journalling a shaft, a lubricant reservoir section connected with said bearing section, said lubricant reservoir section including a plurality of angularly spaced apart capillary slots having their inner regions disposed adjacent said bearing section, said slots extending outwardly from said bearing section with the side walls forming each slot being sufficiently close together to hold lubricant in the slots by capillary attraction between the walls thereof, said capillary slots extending axially beyond at least one end of the bearing section, with said slots being exposed to that end for recapturing lubricant which may escape along the shaft during operation, at least one annular capillary groove connecting the inner regions of the slots together and a plurality of angularly spaced capillary passageways extending between said annular groove and said bore to establish a capillary path for controlled transfer of lubricant in either direction, and at least one channel interconnecting the outer regions of the slots, said channel having a radial width greater than that which will sustain capillary transfer of lubricant in that direction.

7. A single piece bearing and lubricant reservoir unit for use in a dynamoelectric machine comprising a bearing section having a bore for journaling a shaft, a lubricant reservoir section integrally joined to and substantially surrounding said bearing section, said lubricant reservoir section including a plurality of capillary slots having their inner regions arranged next to said bearing section with the side walls forming said slots being sufficiently close together to hold lubricant in the slots by capillary attraction therewith, said sections being formed of permeable material having interconnecting pores between the slot walls and said bore to feed lubricant to said bore, at least one end of said bearing section having a number of capillary grooves extending between at least some of said capillary slots and said bore for transferring excess lubrication from the bore back to said slots for reuse.

8. A bearing support and lubricant reservoir arrangement for use in a dynamoelectric machine, comprising a frame including a housing and a plurality of angularly spaced apart posts projecting radially inward from said housing terminating in a bearing support; a bearing section having a bore supported by said posts; a plurality of plates arranged in the spaces between adjacents posts within said housing and extending downwardly away from said housing toward said bearing section in spaced relation to one another to form a lubricant reservoir, adjacent side walls of said plates defining capillary slots for holding lubricant by capillary attraction, means supporting at least some of said plates at one end, and means for transferring lubricant between said capillary slots and said bearing bore.

9. A bearing support and lubricant reservoir arrangement for use in a dynamoelectric machine comprising a cast frame including a housing and a plurality of angularly spaced apart posts projecting radially inward from said housing to terminate a bearing support; a bearing section having a bore supported by said posts; a first plurality of angularly spaced apart plates arranged in said spacing within said housing and formed integrally with said bearing section, said plates extending away from said bearing section toward said housing, a cover enclosing one side of the housing, said cover having a second plurality of plates interfitted with the first plurailty to form a number of angularly spaced capillary slots with the side walls of the slots holding lubricant by capillary attraction.

10. The arrangement of claim 8 in which the housing and plates extend axially beyond at least one side of the bearing section, with said capillary slots being exposed to that end for recapturing lubricant which may escape from that side of the bearing during operation.

11. The arrangement of claim 8 in which the posts and plates each include small angularly aligned notches adjacent the inner regions of said slots on one edge thereof to form an annular capillary groove, the associated end face of said bearing having a number of capillary passages communicating between said groove and said bore, said passages and groove forming a capillary lubricant path for transferring lubricant in either direction as dictated by lubricant requirements at that end of the bearing.

12. The arrangement of claim 8 in which means communicates with the outer regions of the individual slots, disposed away from the bearing section, for introducing lubricant thereto, said means forming a barrier against the capillary transfer of lubricant across said means.

References Cited by the Examiner

FOREIGN PATENTS 596,413    5/1934    Germany.
663,245    7/1938    Germany.

FRANK SUSKO, *Primary Examiner.*